Patented June 20, 1939

2,163,445

UNITED STATES PATENT OFFICE 2,163,445

BITUMEN DISPERSIONS AND PROCESS OF MAKING SAME

Leonard Gowen Gabriel and John Frederic Thomas Blott, London, England, assignors, by mesne assignments, to The Flintkote Company, New York, N. Y., a corporation of Massachusetts No Drawing. Application July 31, 1935, Serial No. 33,963. In Great Britain August 2, 1934

9 Claims. (Cl. 134—1)

The present invention concerns a process for the manufacture of bitumen dispersions of a relatively high stability so that, when applied in roadmaking, they are suitable for being mixed with very fine mineral aggregates.

Bitumen dispersions of high stability have hitherto been prepared in several ways, for instance with the aid of proteins, carbohydrates or the like, or with inorganic colloidal or finely divided solid emulsifiers.

Protein or carbohydrate emulsifiers or stabilizers may give dispersions in which the bitumen is dispersed to a sufficiently fine particle size, but these dispersions are often difficult to handle—on account of the tendency on the part of the emulsifier to form stiff gels or highly viscous solutions—and also as a rule they cannot be satisfactorily stored under normal conditions because the said emulsifiers are subject to putrefaction.

In organic emulsifiers, such as colloidal clay or the gels of the hydroxides of multivalent metals, give bitumen dispersions which are usually very coarse, compared with normal dispersions made with soap solutions; moreover they are usually of a thick pasty consistency or else thixotropic. The dispersions of this type therefore cannot be handled in the same way as normal road dispersions, which are fluid and can easily be pumped and sprayed. Moreover, the very coarse degree of dispersion of the bitumen renders them to a large extent unsatisfactory, since the dispersed bitumen particles are comparable in size to or larger than the particles of the fine mineral aggregate around which they should be capable of forming a continuous film of bitumen.

The emulsifiers which have been mentioned above are all insoluble in bitumen, even when they are dry, and the dried film from the dispersion contains these emulsifiers as a structure which immobilises the film and renders it non-tacky.

Each of the present known types of stable bitumen dispersions therefore shows disadvantages under some or all of the following headings: 1, putrefaction; 2, abnormal flow properties; 3, coarse dispersion; 4 insolubility of the emulsifier in the bitumen.

The bitumen dispersions of a relatively high stability according to the invention, which are prepared with a neutral or alkaline, aqueous solution of an alkali soap of solid rosin, are characterized by the presence therein of a suitable quantity of calcium or such like rosinate.

According to the invention the preferred process for the manufacture of bitumen dispersions of high stability comprises incorporating into the bitumen a suitable quantity of a specially prepared calcium rosinate and thereupon dispersing the bitumen thus treated in a neutral or alkaline, aqueous solution of an alkali (potassium or sodium) soap of solid rosin. Bitumen dispersions prepared in accordance with the above are referred to hereinafter as Type I.

According to the invention also the said bitumen dispersions can be stabilised further by the addition of a calcium chloride solution preferably in an amount chemically equivalent to the amount of alkali resin soap emulsifier used. In a similar way also other normally coagulative electrolyte solutions capable of acting upon the alkali resin soap emulsifier, such as aluminium chloride, may be used instead of calcium chloride. Bitumen dispersions prepared in this way are referred to hereinafter as Type II.

Calcium rosinate may be prepared by heating a mixture of solid rosin and quick or hydrated lime, using sufficient lime to neutralise the acids of the rosin. Heating is continued until the material on cooling is found to be free from uncombined lime. Since, however, certain commercial grades of calcium rosinate, or lime-hardened rosin, may not be satisfactory for the purposes of the invention, care should be taken to select the proper type of solid rosin which yields satisfactory results with respect to the high stability desired in the bitumen dispersion. In general wood rosins have been found to suit best the purposes of the invention, although in certain cases the wood rosin may be substituted by other types of rosin, either for preparing the alkali resin soap used as the emulsifier, or for preparing the calcium rosinate, but preferably not for both purposes.

The process, which gave successful results, was carried out with a particular type of solid rosin which is obtained as a residue in the furfural extraction of crude wood rosin. More particularly the solid rosin employed herein is one sold under the designation "B rosin" which is a waste product resulting from the process used in decolorizing rosins. For example, so-called FF Rosin (ruby red in color) is decolorized by being first dissolved in gasoline; a sufficient quantity of furfural is then added. This forms a two liquid layer system in which the furfural layer acts as a selective solvent on the unsaponifiables and coloring bodies in the original FF Rosin used. After proper treatment the furfural layer is separated and distilled to recover the furfural and the residue remaining is the so-called B Rosin. This B Rosin residue contains most of unsaponifiables from the original rosin, and most of the coloring bodies, as well as a good proportion of the rosin acids.

For example, the so-called FF Rosin shows an analysis substantially as follows:

| | Percent |
|---|---|
| Unsaponifiables | 5 |
| Coloring bodies | less than 1 |
| Gasoline insolubles | 8 |
| Rosin (as abietic acid) | 94 |

After treatment such as above described for decolorizing the same, the B Rosin separated from the furfural layer would have an approximate analysis as follows:

| | Percent |
|---|---|
| Unsaponifiables | 10 to 20 |
| Coloring bodies | 1 to 2 |
| Gasoline insolubles | 60 |
| Rosin (as abietic acid) | 79 to 88 |

The gasoline layer is also distilled and yields a yellow rosin containing a small percentage of unsaponifiables, and a very small amount of coloring bodies.

It is thus seen that the selective solvent action distributes the rosin between the two liquid layers and brings the main portion of the unsaponifiables and coloring bodies into the furfural layer. We wish to state, however, that the process according to the invention is not limited to the use of that particular brand of rosin, it being also applicable with other grades of rosin of the same character and origin capable of producing similar stability in the bitumen dispersions prepared with the aid thereof.

The calcium rosinate prepared in the above-described manner from the above mentioned "B" grade rosin has a melting point of about 135° C. and is not readily dissolved in bitumen or fuel oil at a temperature of 140° C., which is normally the highest convenient working temperature. If, however, the calcium rosinate is fluxed with a further proportion of rosin or if less lime than is required to neutralise the rosin is used in the preparation of the rosinate, a product is obtained which shows a lower melting point and is more easily dissolved; the greater the quantity of excess rosin present, the lower the melting point. The latter calcium rosinate preparations, which in the present instance are referred to as lime-hardened rosin, may be dissolved directly in bitumen or, for convenience's sake, may be first dissolved in fuel oil to give a solution which is used to flux a harder bitumen to a blend of the desired penetration.

In a modification of the above process a solution of lime-hardened rosin in fuel oil may be made from a fuel oil solution of rosin and sufficient lime to neutralise part of the rosin, by heating the mixture until it is seen to be homogeneous on cooling. As already stated, the fuel oil solution may then be used to flux a hard bitumen.

In an alternative embodiment of the invention a bitumen dispersion of the same stable type may be prepared by adding an aqueous suspension of calcium rosinate to a bitumen dispersion prepared by dispersing the bitumen in a solution of the potassium or sodium soap of solid rosin. The aqueous suspension of calcium rosinate is prepared by partially decomposing a solution of the potassium or sodium soap of solid rosin with an aqueous solution of calcium chloride.

A further alternative method of carrying out the invention is to add to a bitumen dispersion prepared by means of an alkali soap of solid rosin a quantity of a solution of salt of a metal forming an insoluble rosinate by double decomposition with the alkali rosinate, the said quantity and concentration of metal salt solution being preferably such that the alkali rosinate is just completely decomposed. In carrying out this form of the invention it is necessary to choose such a dilution of the original emulsion, and such concentration of the added metal salt solution that at the temperature of addition there is no coagulation of bitumen. Generally speaking, more concentrated initial emulsion and more concentrated metal salt solution may be used at lower temperatures. There is in many cases a limiting temperature above which the addition cannot be made without producing coagulation. This temperature must be found by experiment in any particular case.

The bitumen dispersions prepared according to the invention present the following advantages:

Neither the soap emulsifier nor the calcium rosinate introduced into the bitumen in this process are subject to putrefaction.

The bitumen dispersion referred to as Type I is indistinguishable as regards normal characteristics, such as microscopic appearance, flow and storage properties, from a normal good quality dispersion for use in road-making made with soap solution as emulsifier.

The stability of this Type I dispersion to mixing with fine mineral aggregates is, however, very much greater than that of normal road dispersions and is similar to that of dispersions made with protein, carbohydrate or inorganic emulsifiers. The Type I dispersion is also stable to the addition of unlimited quantities of solutions of moderate concentration of various electrolytes, except mineral acids; however, on diluting the dispersion sufficiently with water it becomes stable also to mineral acids.

The bitumen dispersion referred to as Type II, which is made from a dispersion of Type I by the addition of sufficient calcium chloride solution to decompose the resin soap of the emulsifier, is distinguished from that of Type I by initially showing thixotropic properties. On standing for a short time, however, the dispersion changes to a fluid system in which aggregates of particles, in the form of clots or clumps, are suspended in an aqueous medium. These aggregates of particles are readily redispersed and the dispersion is entirely suitable to be mixed with fine mineral aggregates. This Type II dispersion is of even greater stability than that of Type I and is stable, either as such or after dilution with water, to the addition of unlimited quantities of solutions of electrolytes, including mineral acids, of high concentrations.

Since for either type of dispersion the solubility of the calcium rosinate in the bitumen is essential to the process, this emulsifier cannot form the structure in the dried film, which is a disadvantage of stable dispersions of other types.

EXAMPLE

*Type I*

Lime-hardened rosin is prepared by heating the following mixture at 140° C. until homogeneous on cooling:

| | Parts |
|---|---|
| Solid rosin (furfural extracted type) | 100 |
| Hydrated lime | 3.75 |

This material is dissolved at 140° C. in an equal weight of fuel oil having a viscosity of 6000 seconds tested by the method known as Redwood I. According to the usual viscosity conversion tables, this viscosity corresponds, in terms of kinematic viscosity, to about 1464 centistokes or, with regard to the average specific weight of the fuel oil, about 1400 centipoises. 4 parts of the solution are added to 100 parts of 200 penetration bitumen and the mixture is dispersed in a neutral potassium rosinate solution of N/20 concentration, in the normal way, to give a dispersion of 57% bitumen content. The dispersion thus prepared is of Type I.

*Type II*

Sufficient 10% calcium chloride solution is added to the cold dispersion of Type I in order to decompose the soap of the emulsifier, which in a typical case was 1.18 part of said solution to 100 parts of bitumen dispersion.

Having now particularly described and ascertained the nature of our said invention and in what manner the same is to be performed, we declare that what we claim is:

1. A dispersion of bitumen in water of relatively high stability suitable for road making, said dispersion containing, as a dispersing agent, a water soluble alkali metal soap of a solid rosin and containing, as a stabilizing agent, a calcium salt of a solid rosin whereby said dispersion will be characterized by freedom from putrefaction and abnormal flow properties and by stability to mixing with fine mineral aggregate and with solutions of moderate concentrations of electrolytes other than mineral acids.

2. A dispersion of bitumen in water of relatively high stability suitable for road making, said dispersion containing, as a dispersing agent, a water soluble alkali metal soap of a solid rosin and containing, as a stabilizing agent, a calcium salt of a solid wood-rosin, whereby said dispersion will be characterized by freedom from putrefaction and abnormal flow properties and by stability to mixing with fine mineral aggregate and with solutions of moderate concentrations of electrolytes other than mineral acids.

3. A dispersion of bitumen in water of relatively high stability suitable for road making, said dispersion containing a calcium salt of a solid rosin and containing also the reaction product of a water soluble alkali metal soap of a solid rosin and a water soluble salt of a multivalent metal, whereby said dispersion will be characterized by freedom from putrefaction and abnormal flow properties and by stability to mixing with fine mineral aggregate and with solutions of electrolytes.

4. A dispersion of bitumen in water of relatively high stability suitable for road making, said dispersion containing a calcium salt of a solid wood-rosin and containing also the reaction product of a water soluble alkali metal soap of a solid rosin and a water soluble salt of a multivalent metal, whereby said dispersion will be characterized by freedom from putrefaction and abnormal flow properties and by stability to mixing with fine mineral aggregate and with solutions of electrolytes.

5. A process for the manufacture of aqueous dispersions of bitumen of relatively high stability, which comprises dispersing the bitumen, admixed with a calcium salt of a solid rosin, in an aqueous solution of a water soluble alkali metal soap of a solid rosin.

6. A process for the manufacture of aqueous dispersions of bitumen of relatively high stability, which comprises dispersing the bitumen, admixed with calcium salt of a solid wood rosin, in an aqueous solution of a water soluble alkali metal soap of a solid rosin.

7. A process for the manufacture of aqueous dispersions of bitumen of relatively high stability, which comprises dispersing the bitumen, admixed with calcium salt of a solid rosin, in an aqueous solution of a water soluble alkali metal soap of a solid rosin and then adding to the said dispersion a water soluble salt of a multivalent metal in an amount substantially chemically equivalent to the amount of said water soluble alkali metal soap of solid rosin.

8. A process for the manufacture of aqueous dispersions of bitumen of relatively high stability, which comprises first dispersing the bitumen in an aqueous solution of a water soluble alkali metal soap of a solid rosin, and then adding to such dispersion an aqueous suspension of calcium rosinate.

9. A process for the manufacture of aqueous dispersions of bitumen of relatively high stability, which comprises first dispersing the bitumen in an aqueous solution of water soluble alkali metal soap of a solid rosin, and then adding a water soluble salt of a multivalent metal to the said bitumen dispersion, the quantity and concentration of said water soluble salt of a multivalent metal being regulated so as to just completely decompose the said alkali soap of solid rosin.

LEONARD GOWEN GABRIEL.
JOHN FREDERIC THOMAS BLOTT.